Patented Jan. 28, 1930

1,745,004

UNITED STATES PATENT OFFICE

HANS THEODOR BUCHERER, OF MUNICH, GERMANY, ASSIGNOR, BY MESNE ASSIGNMENTS, TO GENERAL ANILINE WORKS, INC., OF NEW YORK, N. Y., A CORPORATION OF DELAWARE

MANUFACTURE OF VAT DYES

No Drawing. Application filed February 24, 1927, Serial No. 170,731, and in Germany May 29, 1925.

I have found that new valuable dyestuffs can be produced by heating aromatic amines and aromatic nitro compounds with strong sulfuric acid. A reaction occurs which may be rather violent, and dyestuffs are obtained the constitution of which is not definitely known and it could only be determined that the amino compound as well as the nitro compound enters into the reaction product, whereas the sulfuric acid does not take part in the reaction, but only acts as an accelerating agent. The relative proportions of amino and nitro compounds may be varied within wide limits; preferably they may be so chosen that from one to two amino groups are present for each one nitro group. Especially useful results are obtained when employing an amino or a nitro derivative or both amino and nitro derivatives belonging to the anthraquinone series. The new dyestuffs are in most cases vat dyestuffs.

The following examples will further illustrate the nature of my invention, but the invention is not limited to these examples. The parts are by weight.

Example 1

186 parts of analine and 123 parts of nitrobenzene are mixed together and introduced into 2000 parts of concentrated sulfuric acid. Thereafter the mixture is carefully heated until a very violent reaction is noticed. As soon as the reaction is over or nearly so, the reaction product can be worked up, as the greatest part of the dyestuff is then formed. Heating may also be continued for some time. After cooling, to the product are added 8000 to 10000 parts of water, whereupon the product is filtered and washed with water and diluted caustic soda lye. A black product is obtained dyeing cotton from a yellowish brown vat grey shades.

Example 2

223 parts of alpha or beta amino-anthraquinone are mixed with 123 parts of nitrobenzene and introduced into 2000 parts of concentrated sulfuric acid. The product is worked up as in Example 1. A black product is obtained dyeing cotton from a brownish yellow vat brownish black shades. The crude reaction products generally contain five distinct substances: (1) unchanged amino-anthraquinone, (2) an alkali soluble portion, (3) a quinoline soluble intermediate which is not soluble in dimethyl-aniline, (4) a quinoline insoluble vat dyestuff constituting the main product, and (5) traces of anthraquinone as sublimate.

The main product mentioned under (4) above when obtained from alpha-amino-anthraquinone has about the composition $C_{68}H_{39}O_{10}N_5$ or $C_{60}H_{32}(CO)_8(NH)_5(OH)_2$ and may probably be represented by the following formula:

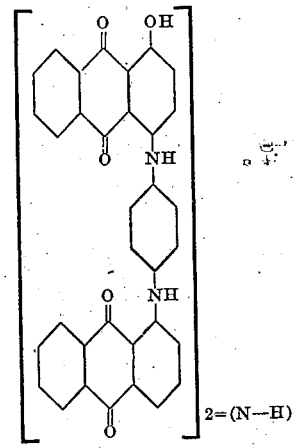

The corresponding product from 2-amino-anthraquinone and nitrobenzene seems to have the composition:

$C_{68}H_{39}O_{11}N_5$ or $C_{60}H_{31}(CO)_8(NH)_5(OH)_3$ and may probably be represented by the following formula:

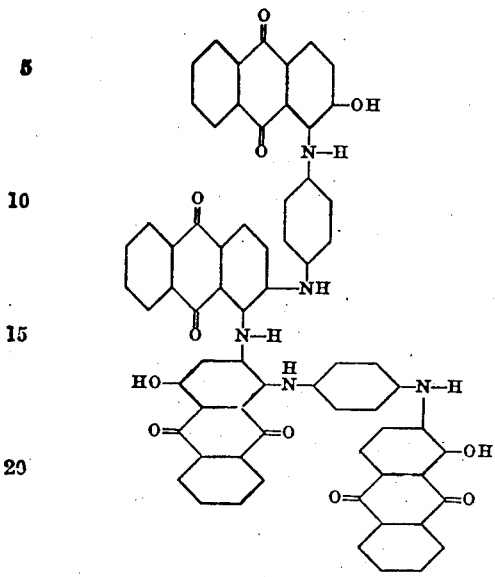

*Example 3*

238 parts of 1.5-diamino-anthraquinone are mixed with 123 parts of nitrobenzene and treated as described in Example 1. A dyestuff is obtained dyeing cotton from brown to brownish black shades.

A molecular proportion of 1 molecule of 1.5- or 1.8-dinitro-anthraquinone or the corresponding amount of a mixture of both for 4 molecules of aniline or 4 molecules of alpha- or beta-amino anthraquinone gives also similar results.

*Example 4*

134 parts of 2-amino-anthraquinone and 104 parts of 1-nitro-naphthalene are heated for 9 hours at 200° C. with 1300 parts of concentrated sulfuric acid. When worked up a black powder is obtained dyeing cotton from a yellowish brown vat blackish brown shades. The analytical data of that portion of the product being insoluble in quinoline are as follows:

$C_{76}H_{43}O_{11}N_5$ or $C_{68}H_{35}(CO)_3(NH)_5(OH)_3$.

*Example 5*

112 parts of 2-amino-anthraquinone and 69 parts of meta-nitraniline are heated for 6 hours to 200 to 210° C. with 1800 parts of concentrated sulfuric acid. The product is worked up as in Example 1, and the dyestuff obtained which for purification is preferably boiled with dimethyl-aniline or quinoline, is a black powder which is soluble in concentrated sulfuric acid with a blue coloration and dyes cotton from a brownish yellow vat violet black shades. The analytical data of that portion of the product remaining after purification with hydrosulphite and being insoluble in quinoline are as follows: $C_{68}H_{40}O_9N_6$.

I claim:

1. The process of manufacturing new vat dyestuffs which comprises causing a mixture of an aromatic amine with an aromatic nitro compound to react at an elevated temperature in the presence of strong sulfuric acid.

2. The process of manufacturing new vat dyestuffs which comprises causing a mixture of a primary aromatic amine with an aromatic nitro compound to react at an elevated temperature in the presence of strong sulfuric acid.

3. The process of manufacturing new vat dyestuffs which comprises causing a mixture of aromatic amino and nitro compounds containing not substantially less than one and not substantially more than two amino groups for each one nitro group to react at an elevated temperature in the presence of strong sulfuric acid.

4. The process of manufacturing new vat dyestuffs which comprises causing a mixture of aromatic amino and nitro compounds one at least of both compounds belonging to the anthraquinone series to react at an elevated temperature in the presence of strong sulfuric acid.

5. As new article of manufacture, the vat dyestuffs obtainable by heating a mixture of 2-amino-anthraquinone with meta-nitraniline in the presence of strong sulfuric acid to between 200° and 210° C., which dyestuff is soluble in concentrated sulfuric acid with a blue coloration and dyes cotton from a brownish yellow vat violet black shades.

In testimony whereof I have hereunto set my hand.

HANS TH. BUCHERER.